No. 784,170. PATENTED MAR. 7, 1905.
C. H. MILLER.
STRAINER VALVE.
APPLICATION FILED MAY 21, 1903.

Witness:
F. W. H. Clay
C. H. Eberk

Inventor,
Charles H. Miller
By
Paul Synnestvedt
Attorney.

No. 784,170.

Patented March 7, 1905

UNITED STATES PATENT OFFICE.

CHARLES H. MILLER, OF KANKAKEE, ILLINOIS.

STRAINER-VALVE.

SPECIFICATION forming part of Letters Patent No. 784,170, dated March 7, 1905.

Application filed May 21, 1903. Serial No. 158,200.

*To all whom it may concern:*

Be it known that I, CHARLES H. MILLER, a citizen of the United States, residing at Kankakee, county of Kankakee, and State of Illinois, have invented a certain new and useful Strainer-Valve, of which the following is a specification.

My invention is designed primarily to provide means for straining dirt and debris out of liquids and convenient means for cleaning the screen or strainer. Other objects of the invention are to provide means for flushing and cleaning the chamber containing the screen; to provide a convenient regulating valve for the flow of liquid; to provide a screen or strainer which may regulate the quantity of liquid allowed to go through the same; and to generally improve the efficiency and cheapen the structure of such devices.

The above objects, together with other advantages which will hereinafter appear, I attain by means of the construction and operation of parts as illustrated in preferred form in the accompanying drawings, wherein—

Figure 3:
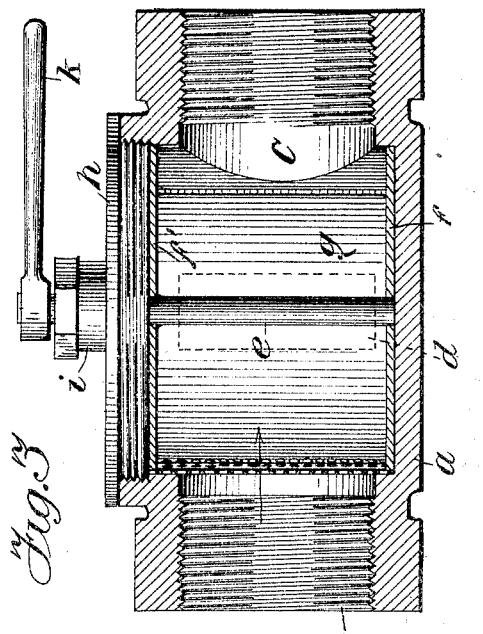
Figure 3 is a central longitudinal section taken at right angles to the section of Figures 1 and 2, through the casing and screen, showing the same in position to strain the liquid.
Figure 4:
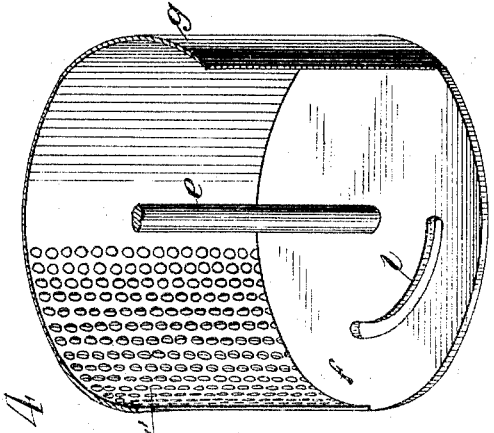
Figure 4 is a perspective view of the strainer valve shield with one of the end plates removed therefrom.

In interposing a screen or sieve in the path of a column of flowing water in order to remove sand, dirt and other debris therefrom, the principal difficulty met with is to clean the screen, and particularly to clean the screen without removing the same or entirely interrupting the flow of water. This latter cannot be done of course if it is necessary to remove the screen from its place. Therefore I provide in a casing $a$, which has an inlet $b$ and an outlet $c$ an enlargement of proper shape to receive the cylindrical screen valve represented in perspective in Figure 4. As will be seen more clearly from Figure 3 the screen valve is made of a rectangular cylindrical form having top and bottom plates $f$, $f'$ and cylindrical walls $g$, continued somewhat over half of the circumference of the plates and provided through a portion of its surface with perforations $g'$. It is inserted through the side of the casing and kept in place by means of the screw cap $h$ and is rotated by means of the central spindle $e$ which is fixed to the two end disks $f$, $f'$ and extends through the screw cap $h$ and a stuffing box $i$ and at its outer end is provided with a handle $k$ with which to operate it.

Figure 1:
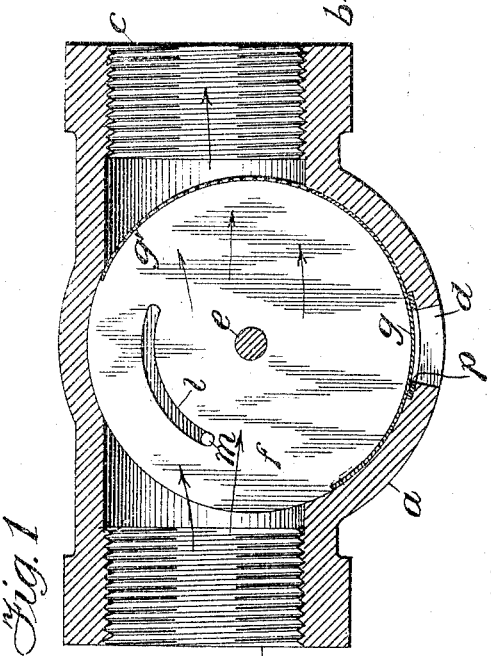
Figure 1 is a central section taken through a pipe casing and cross-wise of the screen device seated therein.
Figure 2:
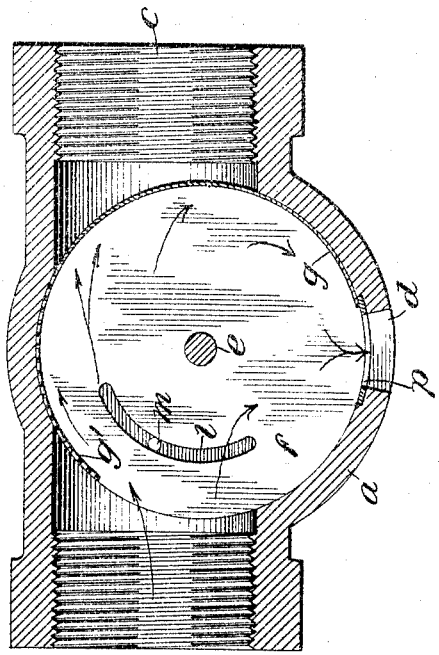
Figure 2 is a view of the same section, showing the strainer in a different position.

From Figures 1 and 2 it will be clear that in one position within the casing $a$ the screen valve $g$ will present to the flow of water the perforated surface only; when turned to another position as shown in Figure 2 the opening at the bottom of the casing $a$ will be exposed while the outlet $c$ of the casing $a$ will be entirely or in part closed, so that the flow of water will take place in part or as a whole out through the opening $d$ and clean the debris out the screen. At the same time, when desired the perforated portion $g'$ of the screen will be rotated backward so as to present itself to the current of water so that the flow therethrough is in opposite direction to that of the ordinary, which will greatly assist in the cleaning. The outlet of the casing $a$ may be entirely or partially closed and likewise the outlet opening $d$ may be opened to any amount desired. The inner surface of the casing around the opening $d$, is provided with a packing $p$ in order to make a perfectly secure seat for the solid portion of the valve screen $g$ to prevent leakage.

A slot $l$ riding upon a pin $m$ in the casing $a$ may be provided in one end of the screen valve in order to limit the motion of the same in either direction as desired.

From the illustrations the operation of the device will be clear. The normal flow of the water in the operation of straining will be such as to accumulate the dirt in the concave side of the screen; but it will be observed that when it is desired to clean the screen the device may be turned upon its central spindle in such a position as to allow flow of the water through the screen from the outside toward the concaved side so as to make sure of removing all of the debris. At the same time the opening $d$ provides convenient means for flushing the same and thoroughly cleaning it out without reversing the position of the screen or without even closing entirely the outlet $c$ or stopping the flow of water. It will be evident that the amount of the perforated portion of the valve $g'$, that is the screen portion, may be regulated at will, and if desired the solid portion of the valve wall may be of such a length as to allow of entirely closing the outlet $c$ without opening that at $d$.

The many advantages of this device will readily occur to those familiar with their use.

Having thus described my invention and illustrated its use, what I claim, and desire to secure by Letters Patent, is the following:

1. The combination with a suitable casing having an inlet and an outlet and an auxiliary flushing opening, of a cylindrical rotary screen fitting flush in the casing, and having a portion of its surface cut out entirely, another portion solid to obstruct the flow, and a third portion perforated to strain the liquid, the screen having means to rotate it and the divisions of the screen being so arranged as to open the flushing opening and pass the liquid in reverse directions through the screen in flushing, while the casing outlet is closed.

2. In a straining device the combination of a casing having an inlet, an outlet, and an auxiliary waste opening, of a partially closed cylindrical screen shell therein fitting flush in the casing and having a part of its surface perforated and another part solid and being rotatable in the casing, whereby the flow may be directed through said open side of the screen and through the perforated side of the screen in a reverse direction while the outlet remains closed and the waste opening is uncovered.

3. In a straining device the combination of a casing having a straightway inlet and outlet on the sides, a bottom outlet opening for flushing, a screw cap closing the cylindrical chamber of the casing, and a screen in said casing in frictional contact with the casing and rotatable to direct the liquid from either side through the screen and through said discharge opening in the bottom of the casing to clean the screen while the outlet is closed.

4. A straining device comprising a valve casing provided with an inlet and an outlet and an auxiliary flushing opening and a rotary screen valve fitting flush therein and provided with an opening in its side, a solid portion and a perforated portion and means for closing the outlet and presenting the perforated portion directly to the normal stream of water on its reverse side while the flushing opening is uncovered.

5. In a straining device the combination with a suitable cylindrical casing having inlet and outlet in its sides, and a bottom discharge opening, of a rotary cylindrical screen fitting flush therein in frictional contact with the casing and having a portion of its surface solid, whereby the normal flow of water may be interrupted in order to flush out the inside of said cylindrical screen, the proportions being such that while the outlet is closed and the discharge opening is uncovered the screen may be washed on both sides.

6. The combination with a suitable casing having an inlet and an outlet and a lateral flushing opening, of a cylindrical rotatable screen in frictional contact with the interior of the casing, having an open side and a portion of its wall solid and a portion perforated, whereby the normal flow of water may be intercepted and the current directed through the flushing outlet of the casing and the screen presented to the current on both sides, for cleaning.

7. The combination with a casing having a removable cap and an inlet and outlet and a discharge opening, of a cylindrical screen valve in the casing having an open portion, a solid portion, and a perforated portion, the proportions of the parts being such that while the normal flow is continuing through the outlet the discharge opening may be uncovered in part to clean the screen, substantially as described.

8. A screen valve device comprising a suitable casing having an inlet and outlet and a lateral flushing opening, a curved screen in said casing having a part of its cylindrical surface made solid, and provided with a central spindle, a screw-cap to close said casing and a handle upon said spindle to turn said screen, the screen and solid portion being so arranged that the flow of water may be partially intercepted in order to dump the contents of the screen through the said lateral opening, while the normal flow continues through the outlet.

In testimony whereof I have hereunder signed my name in the presence of the two subscribed witnesses.

CHARLES H. MILLER.

Witnesses:
 THOS. R. COOK,
 E. P. HETTIGER.